(12) United States Patent
Fujiwara et al.

(10) Patent No.: US 8,276,475 B2
(45) Date of Patent: Oct. 2, 2012

(54) PART ASSEMBLING APPARATUS

(75) Inventors: Katsumi Fujiwara, Tochigi (JP); Takayuki Motojima, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 237 days.

(21) Appl. No.: 12/766,380

(22) Filed: Apr. 23, 2010

(65) Prior Publication Data
US 2010/0269604 A1    Oct. 28, 2010

(30) Foreign Application Priority Data
Apr. 24, 2009   (JP) .................................. 2009-106330

(51) Int. Cl.
*F16H 1/20* (2006.01)
*F16H 1/24* (2006.01)
*F16H 55/02* (2006.01)

(52) U.S. Cl. .................................. 74/424.76; 74/424.72
(58) Field of Classification Search ................ 74/89.28, 74/89.3, 89.39, 424.72, 424.75, 424.76
See application file for complete search history.

(56) References Cited

U.S. PATENT DOCUMENTS

| 2,776,577 | A | * | 1/1957 | Olchawa | 74/424.75 |
| 4,730,503 | A | * | 3/1988 | Rosenthal | 74/58 |
| 5,373,754 | A | * | 12/1994 | Takei | 74/424.76 |
| 2005/0269887 | A1 | * | 12/2005 | Blanding et al. | 310/112 |

FOREIGN PATENT DOCUMENTS

| JP | 58109234 A | 6/1983 |
| JP | 10-109233 | 4/1998 |
| JP | 2423827 Y | 3/2001 |
| JP | 2008-178928 | 8/2008 |

* cited by examiner

*Primary Examiner* — Justin Krause
(74) *Attorney, Agent, or Firm* — Rankin, Hill & Clark LLP

(57) ABSTRACT

A part assembling apparatus is provided with a plurality of assembling portions and a ball screw shaft. Each of the assembling portion includes a nut runner for assembling a part to an assembling target. The ball screw shaft includes a thread portion. At least two of the plurality of assembling portions respectively include nut portions threadedly engaged with the thread portion. The nut portions are movable in an axial direction of the ball screw shaft. The thread portion includes a first thread part having a first pitch and a second thread part having a second pitch different from the first pitch.

13 Claims, 8 Drawing Sheets

PART ASSEMBLING APPARATUS

BACKGROUND OF THE INVENTION

1. Field of the Invention

The present invention relates to a part assembling apparatus including multiple nut runners.

2. Background Art

Conventionally, for assembling parts to an assembling target, there are widely used nut runners. In addition, for assembling a large number of bolts (nuts) at the same time, there is known an apparatus which includes multiple nut runners.

As an apparatus including a plurality of nut runners, there is known an apparatus which adjusts an interval between the nut runners using a camshaft to thereby manage to assemble parts to assembling targets (which are different in shape), the bolts (nuts) of which are situated at different positions (see JP-A-2008-178928). In this apparatus, in the outer periphery of the cam shaft, there is previously formed a given cam groove which is inclined in the axial direction of the cam shaft and, when rotating the cam shaft, a cam follower connected to the nut runners is engaged with the cam groove to thereby move the nut runners.

In the above-mentioned conventional apparatus, since the cam groove must be formed to the shape of an assembling target, when assembling an assembling target not corresponding to the cam groove, it is necessary to prepare a cam shaft having a cam groove corresponding to such assembling target. That is, it is said that the above conventional apparatus is poor in the general purpose property. In this case, since there is also necessary an operation to replace a cam shaft with another, there is a fear that the time for preparing the assembling operation can be prolonged.

SUMMARY OF THE INVENTION

One or more embodiments of the invention provide a part assembling apparatus which can change an interval between nut runners easily according to a method different from the conventional method.

In accordance with one or more embodiments of the invention, a part assembling apparatus is provided with: a plurality of assembling portions, wherein each of the assembling portion includes a nut runner for assembling a part to an assembling target; and a ball screw shaft including a thread portion. At least two of the plurality of assembling portions respectively include nut portions threadedly engaged with the thread portion, and the nut portions are movable in an axial direction of the ball screw shaft. The thread portion includes a first thread part having a first pitch and a second thread part having a second pitch different from the first pitch.

According to the structure of the above apparatus, since the pitches of the first and second thread parts are different from each other, when the ball screw shaft is rotated, a moving amounts of a nut portion (which is also referred to as a first nut part hereinafter) engaged with the first thread part is different from a moving amount of a nut portion (which is also referred to as a second nut part hereinafter) engaged with the second thread part. This makes it possible to change an interval between a nut runner situated on the first nut part side and a nut runner situated on the second nut part side. Also, since the interval between the nut runners can be adjusted according to the amount of rotation of the ball screw shaft, the apparatus can deal with a wide variety of shapes of an assembling target (that is, an assembling target is not limited to a given specific shape).

In the apparatus of one or more embodiments of the invention, the second thread part may include an inverse thread part having a twist direction opposite to a twist direction of the first thread part.

According to the above structure, since the twist directions of the first thread part and the inverse thread part are opposite to each other, when the ball screw shaft is rotated, the moving direction of the first nut part is opposite to the moving direction of a nut portion threadedly engageable with the inverse thread part (which is also referred to as an inverse nut portion hereinafter). Owing to this, an interval between a nut runner situated on the first nut part side and a nut runner situated on the inverse nut portion side can be changed efficiently.

Moreover, the apparatus of one or more embodiments of the invention may further includes: a base unit on which the plurality of assembling portions and the ball screw shaft are disposed; and a lock mechanism configured to lock the base unit and the plurality of assembling portions to each other.

According to the above structure, by locking the assembling portions and base unit to each other using the lock mechanism, when the bolts (nuts) are fastened, moment, which is generated in the assembling portions from the nut runners, can be received by the base unit. Owing to this, an operation to assemble a part to an assembling target can be carried out in a stable state. Also, since the moment can be prevented from concentrating on the thread portion, there can be eliminated a fear that the ball screw shaft can be damaged.

According to the apparatus of one or more embodiments of the invention, since the pitches of the first and second thread parts are different from each other, the interval between the nut runner situated on the first nut part side and the nut runner situated on the second nut part side can be changed. Also, since the interval between the nut runners can be adjusted according to the rotation amount of the ball screw shaft, the apparatus can be applied to anyone of assembling targets which are variously different in shape.

Other aspects and advantages of the invention will be apparent from the following description, the drawings and the claims.

DETAILED DESCRIPTION OF THE EXEMPLARY EMBODIMENTS

Exemplary embodiments of the invention are described with reference to Drawings.

First Embodiment

Descriptions will be given below of a part assembling apparatus (a first apparatus) according to a first embodiment of the invention with reference to FIGS. 1 to 5B.

The first apparatus is an apparatus which tightens a plurality of (for example, ten) bolts to thereby mount a dummy head (a part) onto the cylinder block (assembling target) of an engine. Here, the first apparatus also can loosen the above-tightened bolts to thereby remove the dummy head from the cylinder block.

Figure 1:
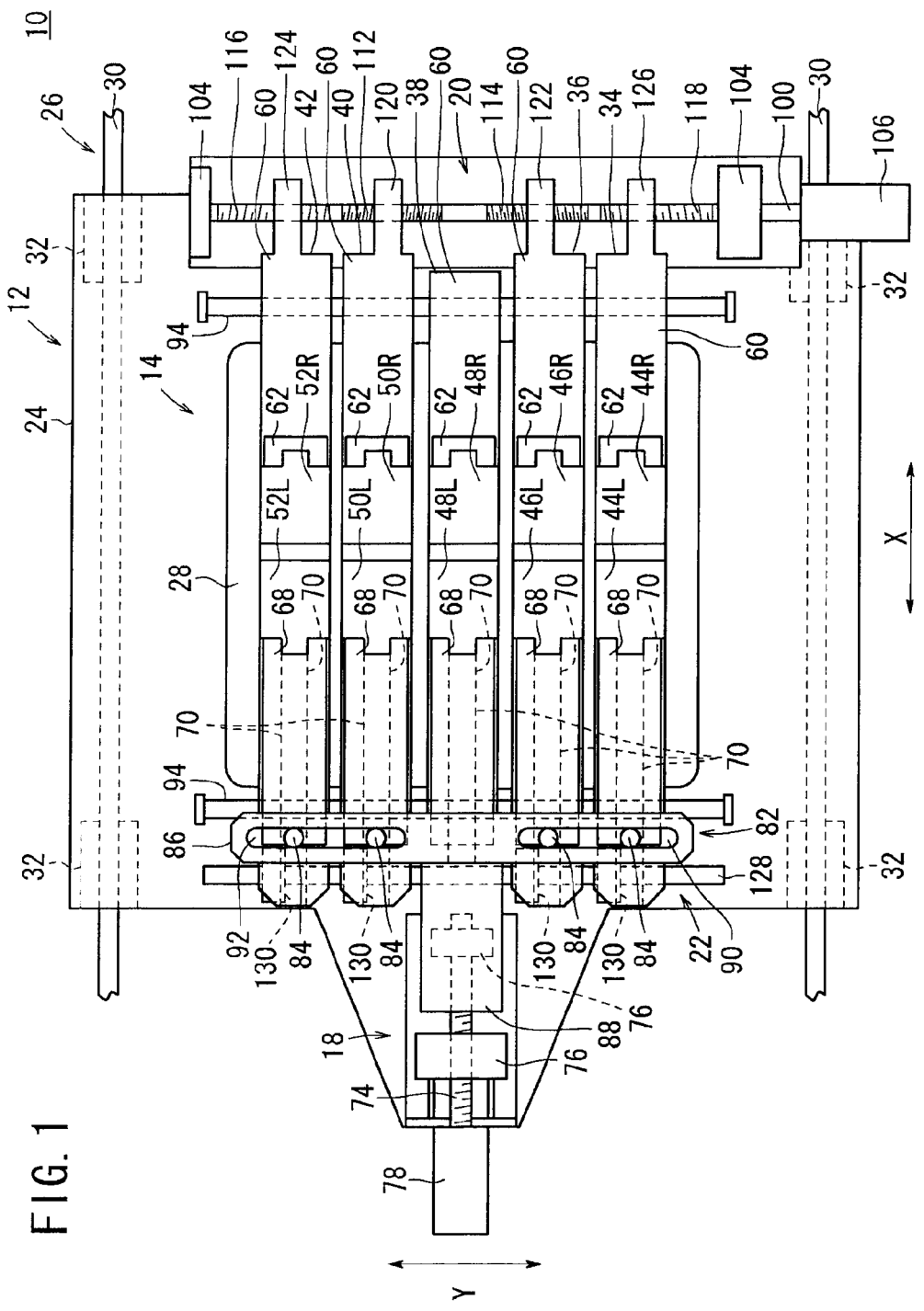
FIG. 1 is an explanatory view of main portions of a part assembling apparatus according to a first embodiment of the invention.
Figure 2:
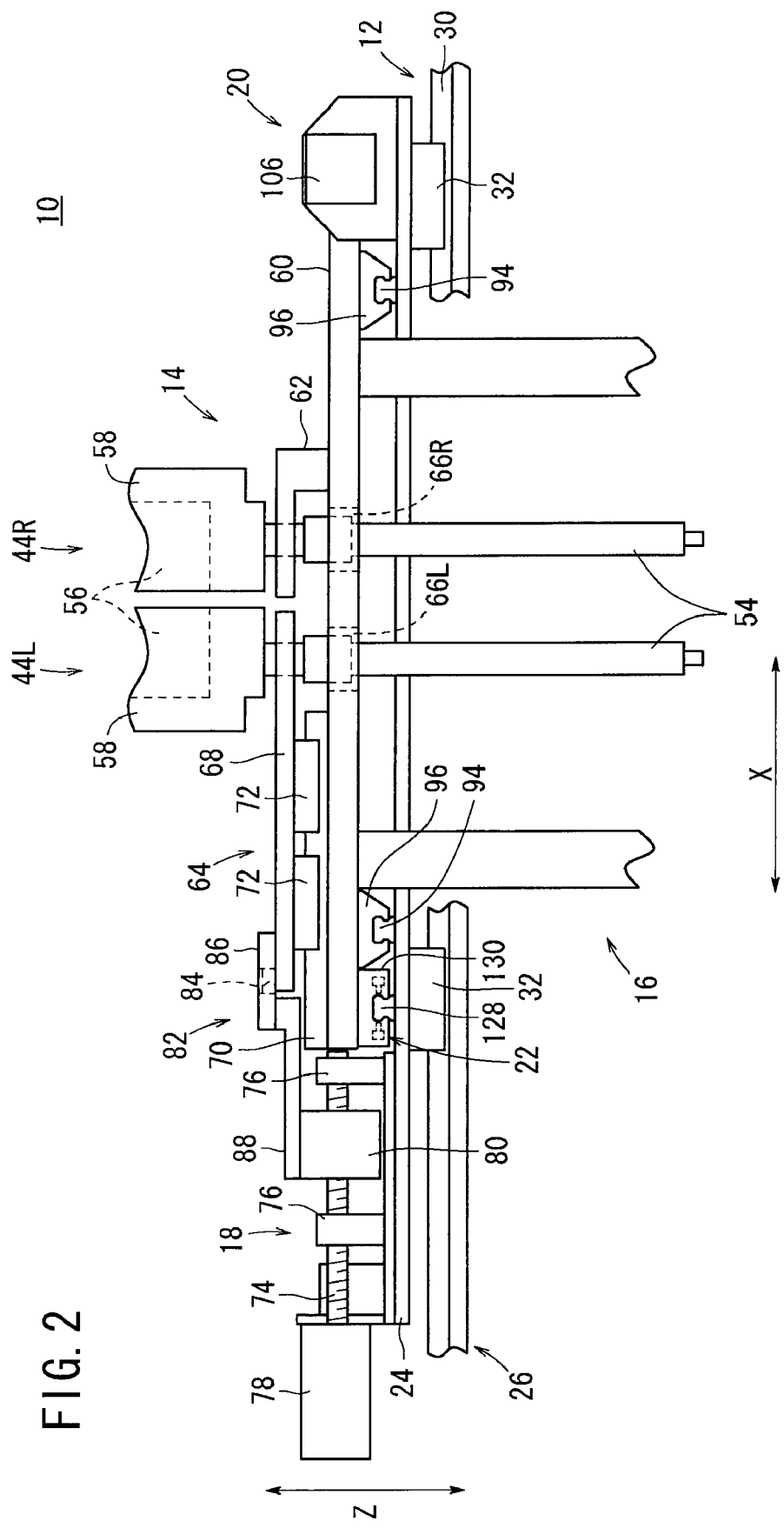
FIG. 2 is a side view of the apparatus of FIG. 1.

As shown in FIGS. 1 and 2, the first apparatus 10 includes a base unit 12, an assembling mechanism 14, a hoist unit 16, a nut runner moving mechanism 18, an assembling portion moving mechanism 20 and a lock mechanism 22.

The base unit 12 includes a base plate 24 and a base plate moving device 26 for moving the base plate 24 in one direction (in an arrow mark X direction). On the upper surface of the base plate 24, there are disposed the assembling mechanism 14, nut runner moving mechanism 18 and assembling portion moving mechanism 20. Substantially in the central portion of the base plate 24, there is formed an opening 28 having a substantially square shape. In the base plate moving device 26, there are disposed a pair of base plate rails 30, 30 respectively disposed vertically downwardly of the base plate 24 and extending in the X direction, and a plurality of (four) base plate sliders 32, 32, 32, 32 respectively mounted on the lower surface of the base plate 24 in such a manner that they are free to slide with respect to the paired base plate rails 30, 30.

The assembling mechanism 14 includes first to fifth assembling portions 34, 36, 38, 40 and 42 respectively arranged in a direction (an arrow mark Y direction) perpendicular to the moving direction of the base plate 24. In the first assembling portion 34, there are disposed first nut runners 44L and 44R; in the second assembling portion 36, there are disposed second nut runners 46L and 46R; in the third assembling portion 38, there are disposed third nut runners 48L and 48R; in the fourth assembling portion 40, there are disposed fourth nut runners 50L and 50R; and, in the fifth assembling portion 42, there are disposed fifth nut runners 52L and 52R, respectively. Here, in the following description, when no distinction is drawn between the right and left, the subscripts "L" and "R" can be omitted. The first to fifth nut runners 44, 46, 48, 50 and 52 are respectively situated within the opening 28. Also, the first to fifth nut runners 44, 46, 48, 50 and 52 respectively include engaging portions 54 engageable with their associated bolts (not shown) and main body portions 58 having their associated drive motors 56 for rotating their associated engaging portions 54 in a direction where the bolts are tightened or in a direction where the bolts are loosened.

Next, description will be given below of the structure of the first assembling portion 34 except for the first nut runners 44. Here, the second, fourth and fifth assembling portions 36, 40 and 42 respectively have the same structure as the first assembling portion 34, and the third assembling portion 38 has substantially the same structure as the first assembling portion 34. Thus, the duplicate description of the second to fifth assembling portions 36, 38, 40 and 42 is omitted here. The first assembling portion 34 includes a support plate 60 extending in the X direction over the opening 28, a holding portion 62 formed in the support plate 60 for holding the first nut runner 44R, and a movably supporting portion 64 for supporting the first runner 44L in such a manner that it can be moved with respect to the support plate 60. The support plate 60 has insertion holes 66L and 66R through which the first nut runners 44L and 44R can be inserted respectively. The insertion hole 66L is formed to have such size that, in a state where the first nut runner 44L is inserted through the insertion hole 66L, allows the formation of a certain clearance with respect to the first nut runner 44L. Specifically, the insertion hole 66L is formed to have such size that allows the first nut runner 44L to move 30 mm in the X direction. Owing to this, the first nut runner 44L can be moved with respect to the support plate 60. The movably supporting portion 64 includes a fixed plate 68 fixed to the first nut runner 44L, a rail portion 70 disposed on the upper surface of the support plate 60 and extending in the X direction, and a pair of slider portions 72, 72 respectively mounted on the lower surface of the fixed plate 68 in such a manner that they are allowed to slide with respect to the rail portion 70.

The nut runner moving mechanism 18 moves the first to fifth nut runners 44L, 46L, 48L, 50L and 52L in the X direction respectively. The nut runner moving mechanism 18 includes a first ball screw shaft 74 having a thread of a given pitch, a pair of first bearings 76, 76 respectively disposed on the upper surface of the base plate 24 for supporting the first ball screw shaft 74 rotatably, a first motor 78 for rotating the first ball screw shaft 74 in any of forward and opposite directions, a nut runner moving nut portion 80 threadedly engageable with the thread of the first ball screw shaft 74 in such a manner that it is movable in the axial direction of the first ball screw shaft 74, and a guide portion 82 formed in the nut runner moving nut portion 80. The first ball screw shaft 74 is disposed in such a manner that its axial direction is substantially coincident with the longitudinal direction of the rail portion 70 of the third assembling portion 38 (see FIG. 1). The pitch of the thread of the first ball screw shaft 74 can be set arbitrarily. The guide portion 82 includes: guide bolts 84, 84, 84, 84 respectively mounted on the fixed plates 68, 68, 68, 68 of the first, second, fourth and fifth assembling portions 34, 36, 40, 42; a guide plate 86 extending in the Y direction; and, a connecting portion 88 for connecting together the guide plate 86 and nut runner moving nut portion 80. The guide plate 86 is fixed to the fixed plate 68 of the third assembling portion 38 and has a length substantially equal to one side of the opening 28. Also, in the guide plate 86, there are formed a first guide hole portion 90 for guiding the guide bolts 84, 84 corresponding to the first and second assembling portions 34, 36, and a second guide hole portion 92 for guiding the guide bolts 84, 84 corresponding to the fourth and fifth assembling portions 40, 42. The interval in the vertical direction (Y direction) between the first and second guide hole portions 90 and 92 is set such that it allows the guide bolts 84, 84, 84, 84 to move in the Y direction, whereas the interval in the transverse direction (X direction) between the first and second guide hole portions 90 and 92 is set such that it allows the guide bolts 84, 84, 84, 84 to move in the X direction.

Figure 3:
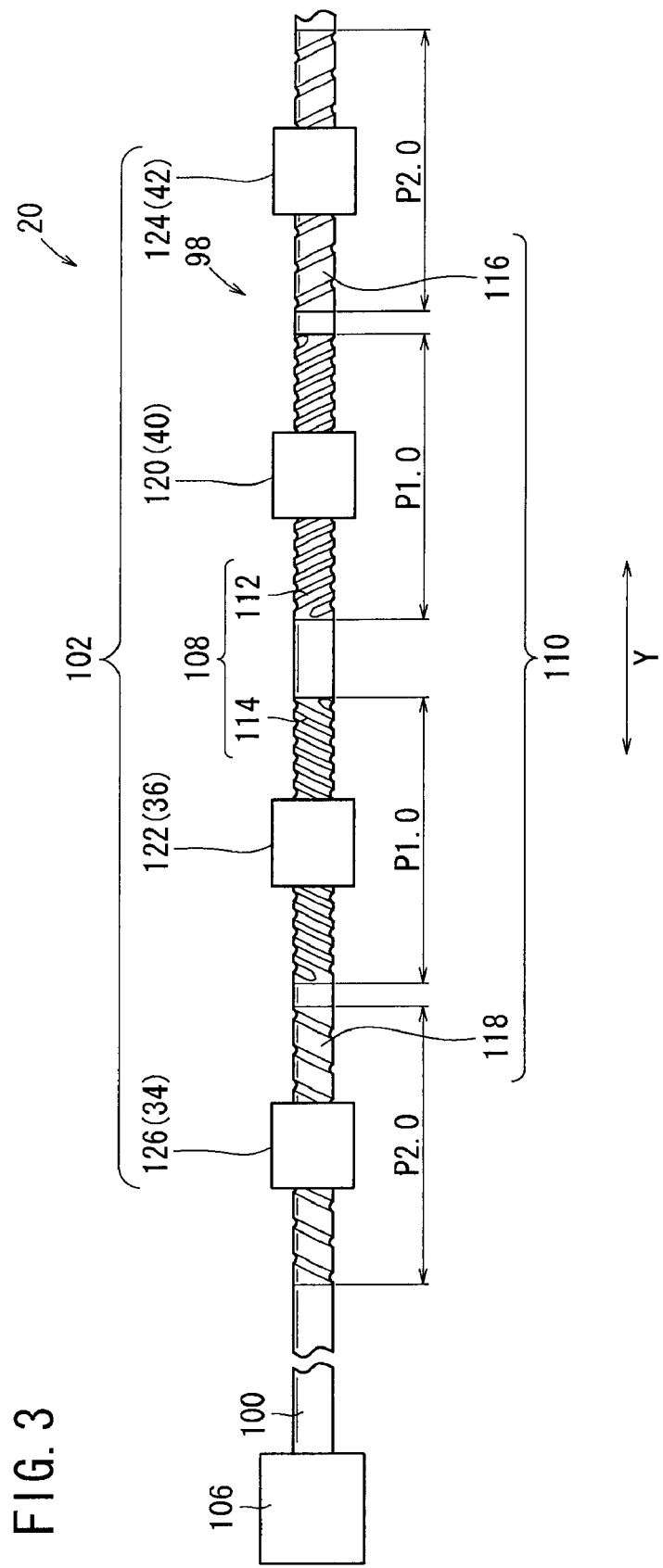
FIG. 3 is an explanatory view of structures of a second ball screw shaft and nut portions.

The assembling portion moving mechanism 20, as shown in FIGS. 1 and 2, is situated on the opposite side to the nut runner moving mechanism 18 of the assembling mechanism 14. Also, the assembling portion moving mechanism 20 includes: a pair of rail portions 94 and 94 respectively disposed on the upper surface of the base plate 24 and extending in the Y direction in such a manner that they respectively exist on the two sides of the opening 28 and sandwich the opening 28 between them; a plurality of slider portions 96 respectively formed on the lower surface of the support plate 60 in such a manner that they are allowed to slide with respect to the paired rails 94 and 94; as shown in FIG. 3, a second ball screw shaft 100 having a thread portion 98; a nut portion 102 threadedly engageable with the thread portion 98 in a state where it can be moved in the axial direction of the second ball screw shaft 100; a pair of second bearings 104 and 104 respectively disposed on the upper surface of the base plate 24 for supporting the second ball screw shaft 100 rotatably; and, a second motor 106 for rotating the second ball screw shaft 100 in any of forward and opposite directions. The thread portion 98 of the second ball screw shaft 100 includes a first thread part 108 having a predetermined pitch (a first pitch) and a second thread part 110 having a different pitch (a second pitch) from the first thread part 108. Specifically, the pitch of the first thread part 108 is set, for example, for 1 mm (in FIG. 3, it is shown by "P1.0"), while the pitch of the second thread part 110 is set, for example, for 2 mm (in FIG. 3, it is shown by "P2.0"). The first thread part 108 includes a first regular thread part 112 having a given twist direction and a first inverse thread part 114 having an opposite twist direction. That is, if a thread on the first regular thread part 112 is a right-hand thread, a thread on the first inverse thread part 114 is a left-hand thread. The second thread part 110 includes a second regular thread part 116 having the same twist direction as the first thread part 112 and a second inverse thread part 118 having the same twist direction as the first inverse thread part 114. The nut portion 102 includes: a first regular nut part 120 formed in the fourth assembling portion 40 in such a manner that it is threadedly engaged with the first regular thread part 112; a first inverse nut part 122 formed in the second assembling portion 36 in such a manner that it is threadedly engaged with the first inverse thread part 114; a second regular nut part 124 formed in the fifth assembling portion 42 in such a manner that it is threadedly engaged with the second regular thread part 116; and, a second inverse nut part 126 formed in the first assembling portion 34 in such a manner that it is threadedly engaged with the second inverse thread part 118. Also, the lengths of the first and second regular thread parts 112, 116 and second inverse thread parts 114, 118 may be set arbitrarily, or they may also be set in such a manner that, for example, the interval between the first to fifth nut runners 44, 46, 48, 50, 52 can be increased to 30 mm.

As shown in FIG. 1, the lock mechanism 22 is situated on the side where the nut runner moving mechanism 18 of the assembling mechanism 14 is situated. And, the lock mechanism 22 includes a locking rail portion 128 disposed on the upper surface of the base plate 24 in such a manner that it extends in the Y direction, and a plurality of (four) lock portions 130, 130, 130, 130 respectively formed on the lower surfaces of the support plates 60, 60, 60, 60 of the first, second, fourth and fifth assembling portions 34, 36, 40, 42.

Figure 4A:
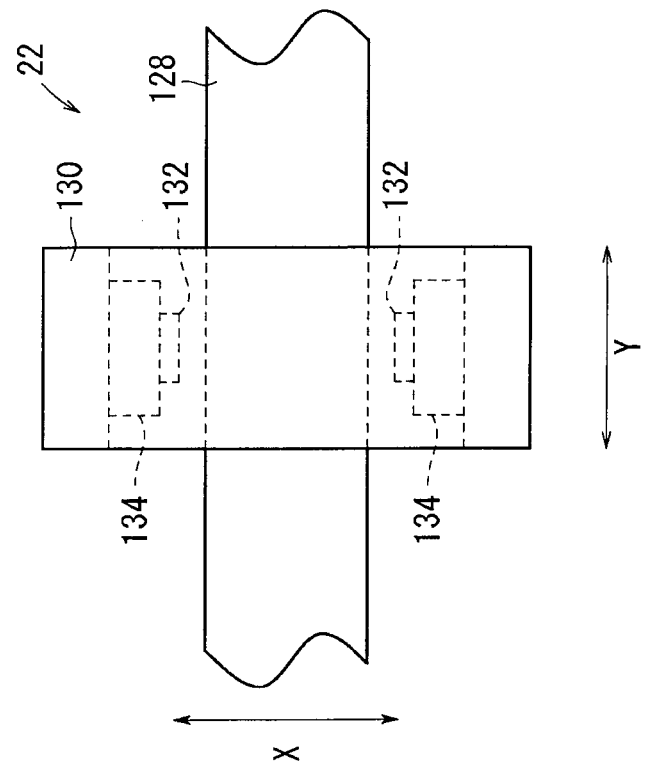
FIG. 4A is an explanatory view of a lock portion.
Figure 4B:
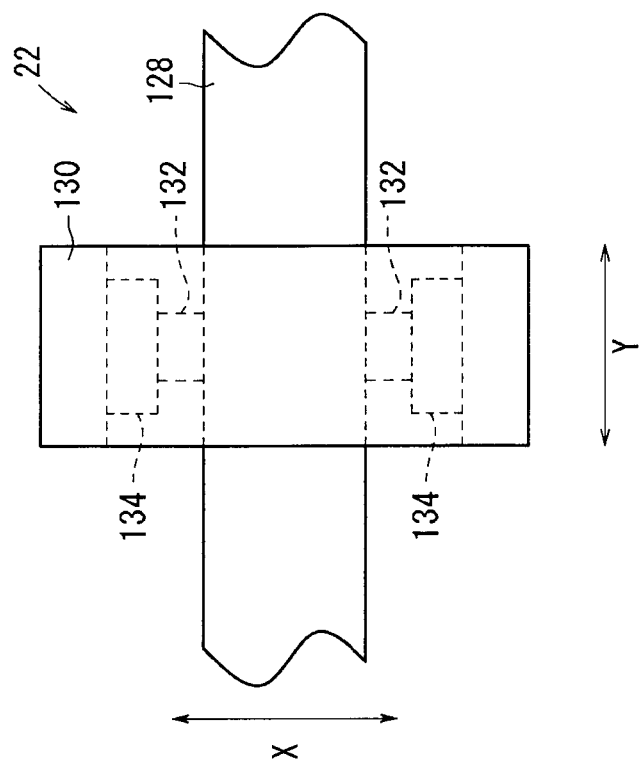
FIG. 4B is an explanatory view of the lock portion.

As shown in FIG. 4, the lock portion 130 includes a pair of pistons 132, 132 respectively disposed in such a manner to sandwich the locking rail portion 128 between them, and a pair of cylinder portions 134, 134 respectively for storing the pair of pistons 132, 132 movably. The paired pistons 132, 132 are formed in such a manner that they can be moved between a lock position (see FIG. 4A), where they can be contacted with the locking rail portion 128, and a lock removal position (see FIG. 4B) where they are not contacted the locking rail portion 128. Here, a drive source for driving the pair of pistons 132, 132 may be selected arbitrarily, for example, there may be used an oil pressure drive source. In this case, there may also be provided a control portion (not shown) which controls the oil pressure in such a manner that the pair of pistons 132, 132 can be moved to the lock position when the drive motor 56 is driven.

Next, description will be given below of the operation of the first apparatus 10. Firstly, when the first ball screw shaft 74 is rotated in the opposite direction using the first motor 78, the nut runner moving nut portion 80 is moved toward the first motor 78; and also, the first to fifth nut runners 44L, 46L, 48L, 50L and 52L, which are respectively connected to the nut runner moving nut portion 80 through the connecting portion 88, guide plate 86, guide bolts 84, 84, 84, 84 and fixed plates 68, 68, 68, 68, are moved toward the first motor 78. This makes it possible to increase the interval between the first to fifth nut runners 44L, 46L, 48L, 50L and 52L and first to fifth nut runners 44R, 46R, 48R, 50R and 52R can be increased. Also, when the first ball screw shaft 74 is rotated in the forward direction using the first motor 78, the first to fifth nut runners 44L, 46L, 48L, 50L and 52L are moved respectively in a direction where they are moved away from the first motor 78, whereby the interval between the first to fifth nut runners 44L, 46L, 48L, 50L and 52L and first to fifth nut runners 44R, 46R, 48R, 50R and 52R can be decreased.

Next, in a state where the pair of pistons 132, 132 of the lock mechanism 22 are respectively set at the lock removal position, when the second ball screw shaft 100 is rotated in the forward direction using the second motor 106, the first and second positive nut parts 120, 124 are respectively moved in a direction where they are moved away from the second motor 106 and the first and second inverse nut parts 122, 126 are respectively moved toward the second motor 106. In this case, since the pitch of the second thread part 110 is set twice the pitch of the first thread part 108, the second forward and inverse nut parts 124, 126 are respectively moved by an amount twice the moving amount of the first forward and inverse nut portions 120, 122. Owing to this, the first and second assembling portions 34, 36 are respectively moved along the pair of rail portions 94, 94 toward the second motor 106, and the fourth and fifth assembling portions 40, 42 are respectively moved along the pair of rail portions 94, 94 in a direction where they are moved away from the second motor 106. Therefore, the interval between the first to fifth assembling portions 34, 36, 38, 40, 42 can be increased. Here, the third assembling portion 38 is not moved in the Y direction. Also, when the second ball screw shaft 100 is rotated in the opposite direction using the second motor 106, the first and second assembling portions 34, 36 are respectively moved in a direction where they are moved away from the second motor 106, and the fourth and fifth assembling portions 40, 42 are respectively moved toward the second motor 106, whereby the interval between the first to fifth assembling portions 34, 36, 38, 40, 42 can be decreased.

Figure 5B:
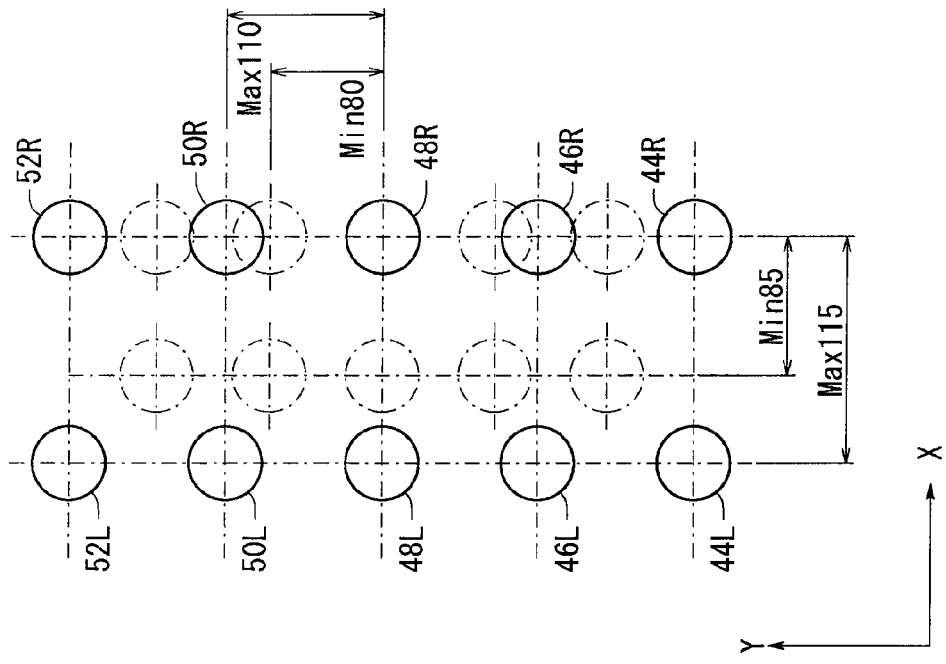
FIG. 5B is an explanatory view of a range where nut runners are movable according to the first embodiment.
Figure 5A:
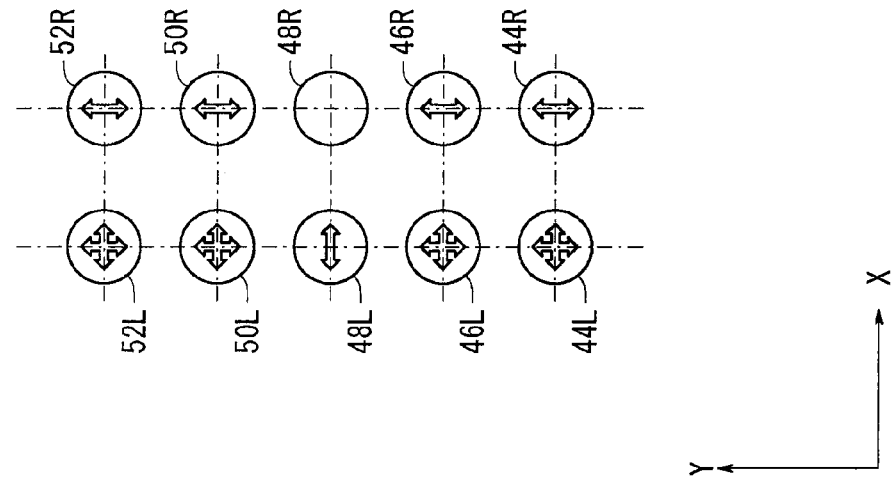
FIG. 5A is an explanatory view of a direction where nut runners are movable according to the first embodiment.

Next, description will be given below of the operations of the first to fifth nut runners 44, 46, 48, 50, 52 with reference to FIG. 5. As can be seen from FIG. 5 and also from the above-mentioned description, when the first ball screw shaft 74 is rotated using the first motor 78, the first to fifth nut runners 44L, 46L, 48L, 50L and 52L are moved in the X direction respectively; and, when the second ball screw shaft 100 is rotated using the second motor 106, the first nut runner 44R, second nut runner 46R, fourth nut runner 50R and fifth nut runner 52R are moved in the Y direction respectively. Here, the third nut runner 48R is not moved. Also, according to the present embodiment, the interval in the X direction between the first to fifth nut runners 44, 46, 48, 50, 52 is adjusted in the range of 80 mm to 110 mm, while the interval in the Y direction between the first to fifth nut runners 44, 46, 48, 50, 52 is adjusted in the range of 85 mm to 115 mm.

According to the present embodiment, since the pitch of the second thread part 110 is set twice the pitch of the first thread part 108, for example, when the first regular and inverse nut parts 120 and 122 are moved by an amount "a", the second regular and inverse nut parts 124 and 126 are moved by an amount "2a". Therefore, only by rotating the second ball screw shaft 100 using the second motor 106, the interval between the first and second nut runners 44, 46 and the interval between the fourth and fifth nut runners 50, 52 can be changed. Also, since the thread portion 98 of the second ball screw shaft 100 includes the first and second inverse thread parts 114, 118, the moving direction of the first and second nut runners 44, 46 and the moving direction of the fourth and fifth nut runners 50, 52 can be made symmetric with respect to the center of the third nut runner 48. Owing to this, the interval between the first to fifth nut runners 44, 46, 48, 50, 52 can be changed efficiently. Further, since the interval between the first to fifth nut runners 44, 46, 48, 50, 52 can be adjusted according to the amount of rotation of the second ball screw shaft 100, the present embodiment is able to deal with a wide variety of shapes of cylinder blocks.

According to the present embodiment, since, when the engaging portion 54 is rotated using the drive motor 56, the pair of pistons 132, 132 are contacted with the locking rail portion 128, the first to fifth nut runners 44, 46, 48, 50, 52 and base plate 24 can be locked to each other. Owing to this, when tightening the bolt, moment, which is produced in the first to fifth assembling portions 34, 36, 38, 40, 42 from the first to fifth nut runners 44, 46, 48, 50, 52, can be received by the base plate 24. Thus, the assembling of the dummy head to the cylinder block can be carried out in a stable state. Also, since the moment can be prevented from concentrating on the thread portion 98 of the second ball screw shaft 100, there can be eliminated a fear that the second ball screw shaft 100 can be damaged.

The first embodiment is not limited to the above-mentioned example but it can be carried out in various manners. Although, in the above-mentioned embodiment, the pitch of the second thread part is set twice the pitch of the first thread part, it is not limitative but the pitch of the second thread part can be set arbitrarily, provided that it is different from the pitch of the first thread part. The assembling portion, where the nut portion threadedly engageable with the second ball screw shaft is formed, may be provided at least two. For example, the fourth and fifth assembling portions may also be omitted.

Second Embodiment

Next, description will be given below of a part assembling apparatus (second apparatus) according to a second embodiment of the invention with reference to FIGS. 6 to 8B. Here, in the second embodiment, its structures in common with the first embodiment are given the same reference numerals and thus the duplicate description thereof is omitted here.

Figure 6:
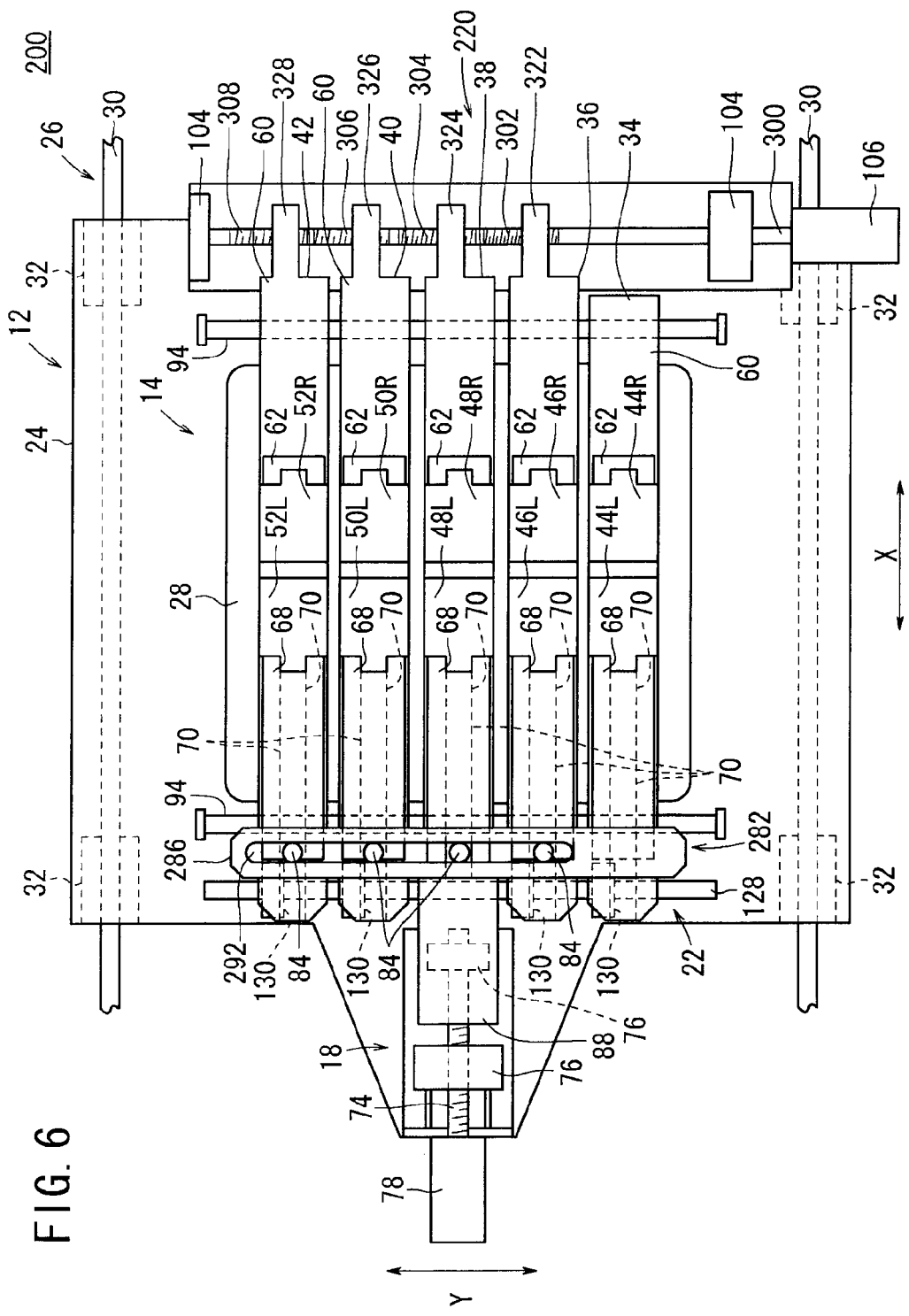
FIG. 6 is an explanatory view of main portions of a part assembling apparatus according to a second embodiment of the invention.

As shown in FIG. 6, the second embodiment is different from the first embodiment in the structures of an assembling portion moving mechanism 220 and a guide portion 282. Specifically, the assembling portion moving mechanism 220 includes a third ball screw shaft 300 instead of the second ball screw shaft 100 of the first apparatus 10, and eleventh to fourteenth nut parts 322, 324, 326, 328 instead of the first and second regular nut parts 120, 124 and first and second reverse nut parts 122, 126.

Figure 7:
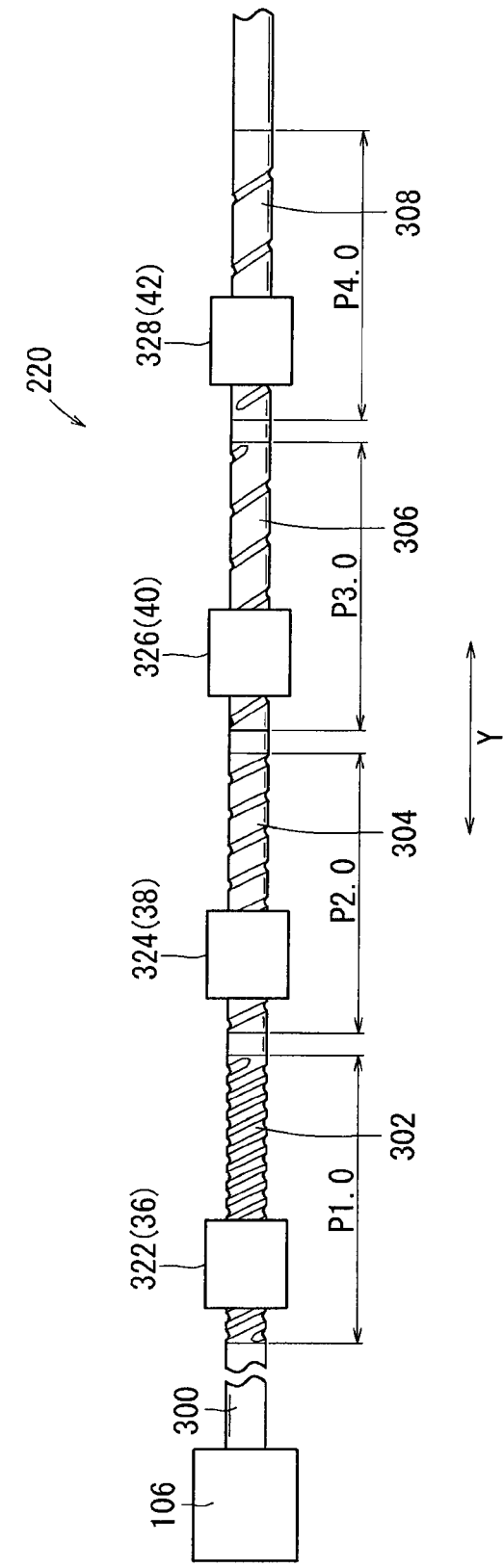
FIG. 7 is an explanatory view of structures of a third ball screw shaft and nut portions.

As shown in FIG. 7 as well, the thread portion of the third ball screw shaft 300 includes an eleventh to fourteenth thread parts 302, 304, 306, 308 respectively having the same twist direction. The eleventh thread part 302 has a predetermined pitch, the twelfth thread part 304 has a pitch twice the pitch of the eleventh thread part 302, the thirteenth thread part 306 has a pitch three times the pitch of the eleventh thread part 302, and the fourteenth thread part 308 has a pitch four times the pitch of the eleventh thread part 302. The eleventh nut part 322 is formed in a second assembling portion 36 in a state where it is threadedly engaged with the eleventh thread part 304, the twelfth nut part 324 is formed in a third assembling portion 38 in a state where it is threadedly engaged with the twelfth thread part 304, the thirteenth nut part 326 is formed in a fourth assembling portion 40 in a state where it is threadedly engaged with the thirteenth thread part 306, and the fourteenth nut part 328 is formed in a fifth assembling portion 42 in a state where it is threadedly engaged with the fourteenth thread part 308. Here, the first assembling portion 34 is disposed in such a manner that it is not in contact with the third ball screw shaft 300.

As shown in FIG. 6, in a guide portion 282, there is omitted the guide bolt 84 which is mounted on the fixed plate 68 of the first assembling portion 34 but, instead, a guide bolt 84 is mounted on the fixed plate of the third assembling portion 38. And, in a guide plate 286, instead of the first and second guide hole portions 90, 92, there is formed a third guide hole portion 292 for guiding the guide bolts 84, 84, 84, 84 of the second to fifth assembling portions 36, 38, 40, 42 in the Y direction. Here, the guide plate 286 is connected to the fixed plate 68 of the first assembling portion 34.

Figure 8B:
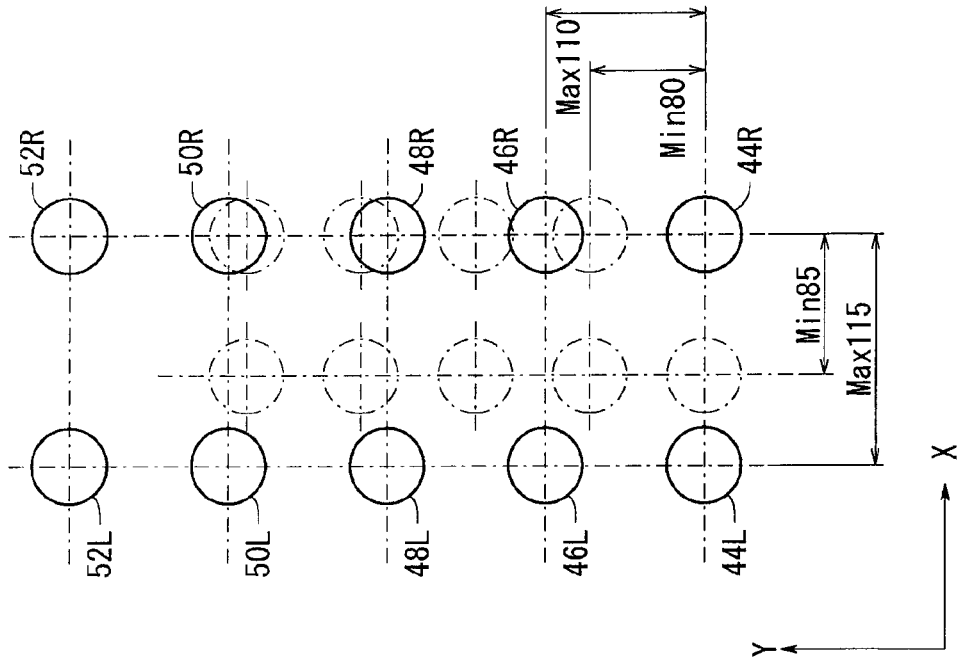
FIG. 8B is an explanatory view of a range where nut runners are movable according to the second embodiment.
Figure 8A:
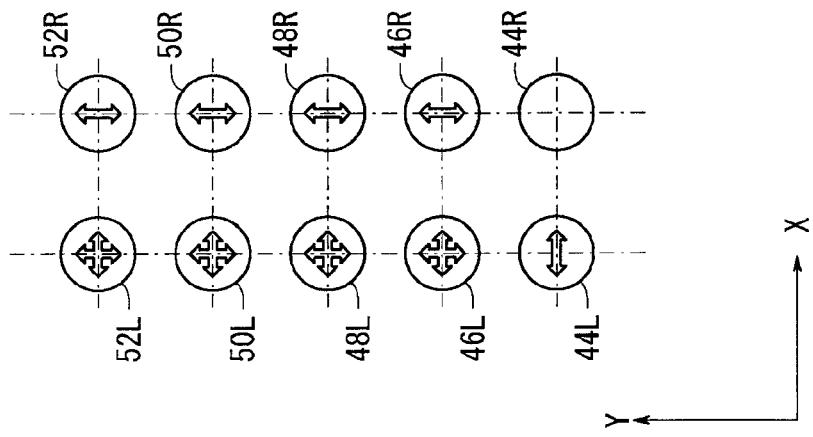
FIG. 8A is an explanatory view of a direction where nut runners are movable according to the second embodiment.

Next, description will be given below of the operations of the first to fifth nut runners 44, 46, 48, 50, 52 of the second apparatus 200 with reference to FIG. 8. As can be seen from FIG. 7 as well, when a first ball screw shaft 74 is rotated using a first motor 78, the first to fifth nut runners 44L, 46L, 43L, 50L, 52L are moved in the X direction. And, when a third ball screw shaft 300 is rotated using a second motor 106, the second to fifth nut runners 46, 48, 50, 52 are moved in the Y direction. Here, the first nut runner 44R is not moved.

According to the present embodiment, the pitch of the twelfth thread part 304 is set twice the pitch of the eleventh thread part 302, the pitch of the thirteenth thread part 306 is set three time the pitch of the eleventh thread part 302, and the pitch of the fourteenth thread part 308 is set four times the pitch of the eleventh thread part 302. Thus, the interval between the first to fifth assembling portions 34, 36, 38, 40, 42 can be changed. As a result of this, the interval between the first to fifth nut runners 44, 46, 48, 50, 52 can be changed.

The second embodiment is not limited to the above example but it can be enforced in various manners. The assembling portion, where there is formed a nut portion which can be threadedly engaged with the third ball screw shaft, may be formed two or more. For example, the fourth and fifth assembling portions may be omitted.

The invention is not limited to apart assembling apparatus for assembling a dummy head to a cylinder block but it can be provided to any part assembling apparatus, provided that it can assemble a part to an assembling target using bolts (nuts).

DESCRIPTION OF REFERENCE NUMERALS AND SIGNS 10, 200: Part assembling apparatus
12: Base unit
22: Lock mechanism
34: First assembling portion
36: Second assembling portion
38: Third assembling portion
40: Fourth assembling portion
42: Fifth assembling portion
44: First nut runner
46: Second nut runner 48: Third nut runner
50: Fourth nut runner
52: Fifth nut runner
98: Thread portion
100: Second ball screw shaft
112: First regular thread part
114: First inverse thread part
116: Second regular thread part
118: Second inverse thread part
120: First regular nut part
122: First inverse nut part
124: Second regular nut part
126: Second inverse nut part

What is claimed is:

1. A part assembling apparatus comprising:
a base unit;
a plurality of assembling portions disposed on the base unit, wherein each of the assembling portions includes at least one nut runner for assembling a part to an assembling target; and
a screw shaft disposed on the base unit, the screw shaft including a thread portion;
wherein a first subset of the plurality of assembling portions each include a nut portion threadedly engaged with the thread portion, the nut portions being movable in an axial direction of the screw shaft such that each of the first subset of the plurality of assembling portions is movable in a first direction along the base unit, said first direction along the base unit being the axial direction of the screw shaft,
a second subset of the plurality of assembling portions is provided separate from the screw shaft and the thread portion so as to be stationarily disposed on the base unit in the first direction, and
the thread portion includes a first thread part having a first pitch and a second thread part having a second pitch different from the first pitch.

2. The part assembling apparatus according to claim 1, wherein the second thread part includes an inverse thread part having a twist direction opposite to a twist direction of the first thread part.

3. The part assembling apparatus according to claim 1, further comprising:
a lock mechanism configured to lock the base unit and the plurality of assembling portions to each other.

4. The part assembling apparatus according to claim 1, wherein only the assembling portions among the first subset of the plurality of assembling portions include a nut portion which is threadedly engaged with the thread portion.

5. The part assembling apparatus according to claim 1, wherein the second subset of the plurality of assembling portions includes only a single assembling portion.

6. The part assembling apparatus according to claim 5, wherein the single assembling portion of the second subset of the plurality of assembling portions is disposed on the base unit so as to be sandwiched in the first direction between a pair of assembling portions of the first subset of the plurality of assembling portions.

7. The part assembling apparatus according to claim 5, wherein the single assembling portion of the second subset of the plurality of assembling portions is disposed on the base unit at an end of the plurality of assembling portions in the first direction.

8. The part assembling apparatus according to claim 1, wherein each of the plurality of assembling portions include two nut runners, and the part assembling apparatus further comprises:
a second screw shaft disposed on the base unit, the second screw shaft having a second thread portion; and
a guide portion connecting the second screw shaft with one nut runner of each of the plurality of assembling portions, the guide portion including a second nut portion threadedly engaged with the second thread portion of the second screw shaft and being movable in an axial direction of the second screw shaft, the guide portion connecting to the one nut runner of each of the plurality of assembling portions so as to move each of the connected nut runners in a second direction along the base unit integrally with movement of the second nut portion along the axial direction of the second screw shaft, the second direction being orthogonal to the first direction.

9. The part assembling apparatus according to claim 8, wherein the guide portion connects to the one nut runner of each of the plurality of assembling portions so as to simultaneously move each of the connected nut runners in the second direction along the base unit integrally with movement of the second nut portion along the axial direction of the second screw shaft.

10. A part assembling apparatus comprising:
a plurality of assembling portions, wherein each of the assembling portions includes two nut runners for assembling a part to an assembling target;
a first screw shaft including a first thread portion;
a second screw shaft including a second thread portion; and
a guide portion connecting the second screw shaft with one nut runner of each of the plurality of assembling portions,
wherein at least two of the plurality of assembling portions respectively include first nut portions threadedly engaged with the first thread portion, the first thread portion including a first thread part having a first pitch and a second thread part having a second pitch different from the first pitch, and the first nut portions are movable in an axial direction of the first screw shaft such that each of the at least two of the plurality of assembling portions is movable in a first direction, said first direction being the axial direction of the first screw shaft, and
the guide portion includes a second nut portion threadedly engaged with the second thread portion of the second screw shaft and being movable in an axial direction of the second screw shaft, the guide portion connecting to the one nut runner of each of the plurality of assembling portions so as to move each of the connected nut runners in a second direction integrally with movement of the second nut portion along the axial direction of the second screw shaft, the second direction being orthogonal to the first direction.

11. The part assembling apparatus according to claim 10, wherein the guide portion connects to the one nut runner of each of the plurality of assembling portions so as to simultaneously move each of the connected nut runners in the second direction integrally with movement of the second nut portion along the axial direction of the second screw shaft.

12. A part assembling apparatus comprising:
a screw shaft;
a first moving portion;
a second moving portion; and
a third moving portion,
wherein the first moving portion, the second moving portion, and the third moving portion respectively include part assembling tools,
wherein the screw shaft includes a first thread section, a second thread section, and a third thread section, wherein the first moving portion includes a first nut portion threadedly engaged with the first thread section,
wherein the second moving portion includes a second nut portion threadedly engaged with the second thread section,
wherein the third moving portion includes a third nut portion threadedly engaged with the third thread section,
wherein a pitch of the first thread section is different from a pitch of the second thread section,
wherein the pitch of the second thread section is different from a pitch of the third thread section, and
wherein the pitch of the third thread section is different from the pitch of the first thread section.

13. A part assembling apparatus comprising:
a screw shaft;
a first moving portion;
a second moving portion; and
a third moving portion,
wherein the first moving portion, the second moving portion, and the third moving portion respectively include part assembling tools,
wherein the screw shaft includes a first thread section, a second thread section, and a third thread section,
wherein the first moving portion includes a first nut portion threadedly engaged with the first thread section,
wherein the second moving portion includes a second nut portion threadedly engaged with the second thread section,
wherein the third moving portion includes a third nut portion threadedly engaged with the third thread section,
wherein a pitch of the first thread section is different from a pitch of the second thread section,
wherein a twist direction of the first thread section is the same as a twist direction of the second thread section, and
wherein a twist direction of the third thread section is different from the twist direction of the first thread section.

* * * * *